March 21, 1944.  E. P. SEXTON  2,344,902
BRAKE SYSTEM
Filed Jan. 6, 1942  2 Sheets-Sheet 1

INVENTOR
EVERETT P. SEXTON
BY
ATTORNEY

March 21, 1944.  E. P. SEXTON  2,344,902
BRAKE SYSTEM
Filed Jan. 6, 1942  2 Sheets-Sheet 2

INVENTOR
EVERETT P. SEXTON
BY
ATTORNEY

Patented Mar. 21, 1944

2,344,902

UNITED STATES PATENT OFFICE 2,344,902

BRAKE SYSTEM

Everett P. Sexton, Jeannette, Pa., assignor to The Westinghouse Air Brake Company, Wilmerding, Pa., a corporation of Pennsylvania Application January 6, 1942, Serial No. 425,725

24 Claims. (Cl. 303—20)

This invention relates to fluid pressure brakes and more particularly to an electrically controlled fluid pressure brake adapted for use on railway vehicles.

The principal object of the invention is to provide a novel electro-hydraulic vehicle brake controlling means.

Another object of the invention is to provide an electrically controlled hydraulic brake system provided with a conductor's switch device adapted to be manually operated to effect an application of the brakes, a trip switch device adapted to be automatically operated from the trackway to effect an application of the brakes, and safety apparatus which includes means for effecting an application of the brakes upon either the incapacitation of an operator, the loss of electric energy or a break-in-two of the train.

A further object of the invention is to provide an electrically controlled hydraulic brake controlling apparatus in which the electric controlling circuit is normally closed so as to insure that an application of the brakes will be effected upon a failure of the source of electrical energy, a break-in-two of the train and thereby the train wires of the control circuit, the incapacitation of the operator, the operation of a conductor's switch to open the circuit, or the operation of a track controlled trip switch to open the circuit.

A still further object of the invention is to provide a novel electrically controlled brake controlling valve device.

Other objects and advantages will appear in the following more detailed description of the invention.

Figure 1:
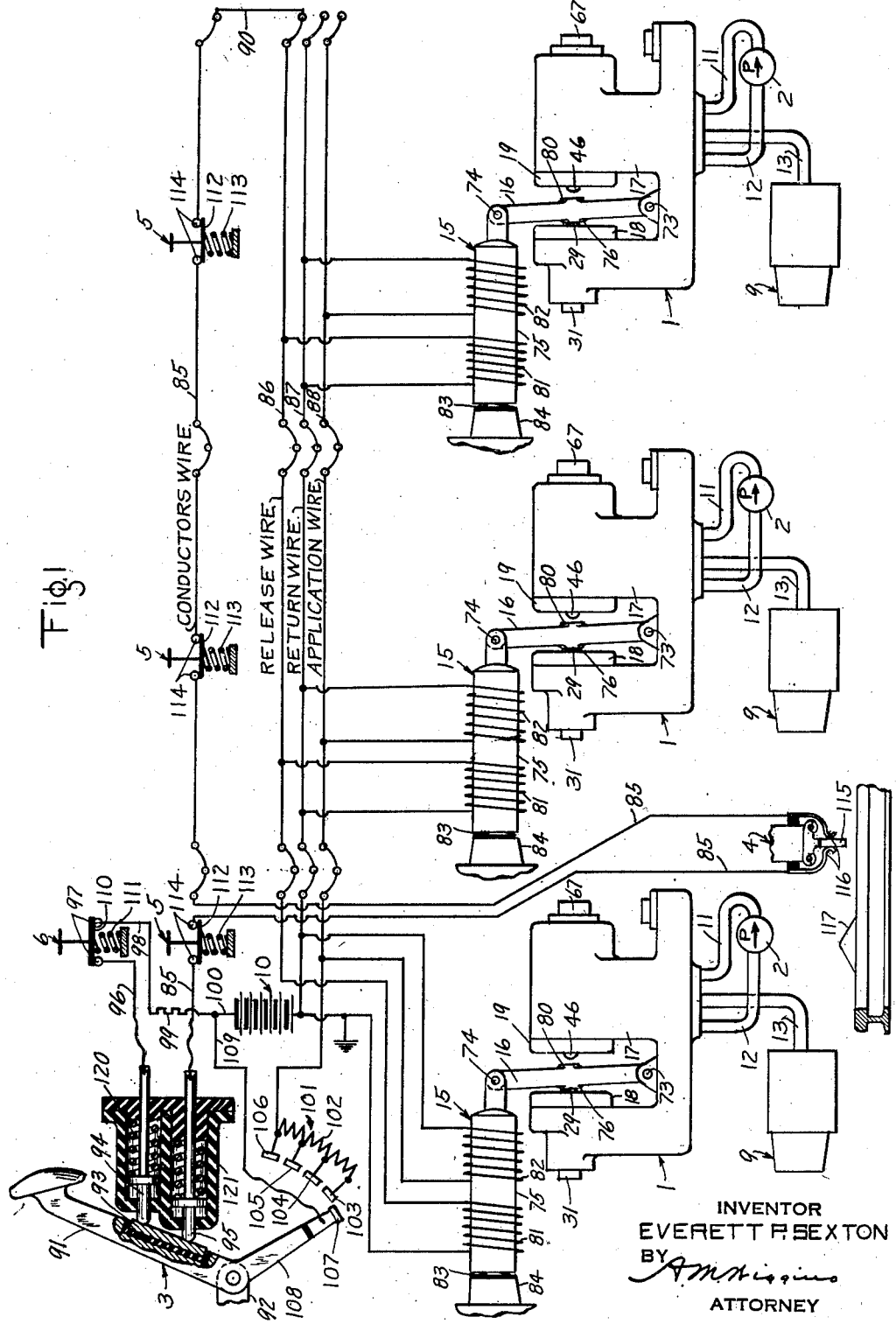

In the acompanying drawings, Fig. 1 is a diagrammatic view, partly in section, of an electrically controlled hydraulic braking system embodying my invention.

Figure 2:
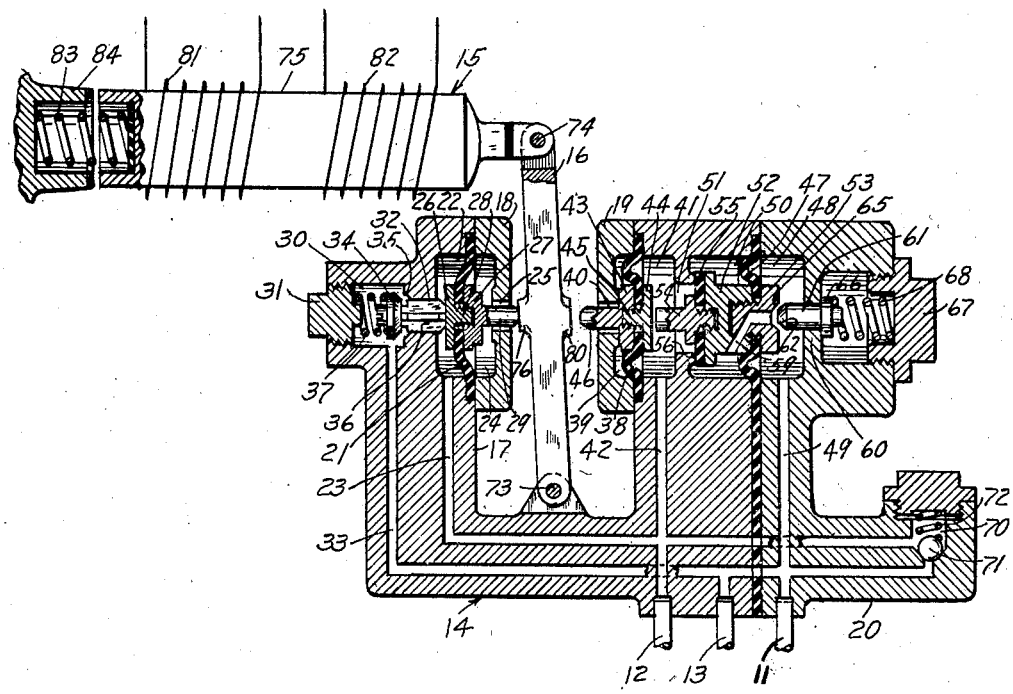

Fig. 2 is a diagrammatic sectional view of the control valve device shown in outline in Fig. 1, the several parts of the device being shown in release or running position.

In Fig. 1 of the drawings the equipment for the locomotive or leading vehicle of a train and two trailing vehicles of the train have been shown. It will be understood that with the exception of the hereinafter described source of electric energy, operator's control switch device, the safety control or deadman's switch device and the trip switch device on the locomotive the brake equipment on all of the trailing vehicles in the train may be similar to that on the locomotive or leading vehicle.

The locomotive or leading car equipment, so far as the invention is concerned, may comprise as shown in Fig. 1 of the drawings, an electrically controlled brake controlling valve device 1, a pump 2, an operator's manually controlled brake controlling switch device 3, a trip switch device 4, a conductor's switch device 5, a safety control switch device 6, a brake cylinder device 9 and a source of electrical energy which is illustrated in the present embodiment of the invention as a storage battery 10.

The brake equipment on each trailing car of the train, in so far as the invention is concerned, comprises an electrically controlled brake controlling valve device 1, a pump 2, a conductor's switch device 5 and a brake cylinder device 9, all of which are identical with the corresponding devices indicated by similar reference numerals on the leading vehicle.

The pump 2, which may be of any standard construction, is driven from the vehicle axle in any suitable manner and is connected to the electrically controlled brake controlling valve device 1, by means of a pump discharge pipe 11 through which the pump forces liquid to the valve device 1. The liquid supply to the pump is by way of an inlet pipe 12 leading from the valve device 1.

The brake cylinder device 9 is of the usual well known construction which is operative, by the force of liquid supplied thereto by the pump, for effecting an application of the brakes and which operates upon a decrease in the force of the liquid therein for effecting a release of the brakes. This brake cylinder is connected to the electrically controlled brake controlling valve device 1 by means of a pipe 13 through which the liquid is adapted to be supplied to and released from the brake cylinder.

The electrically controlled brake controlling valve device 1 for controlling the supply of liquid to and the displacement of liquid from the brake cylinder device 9, may, as best shown in Fig. 2 of the drawings, comprise a brake controlling portion 14, a solenoid portion 15 and a control lever 16 operatively associated with both portions.

The brake controlling portion 14 may comprise a sectional casing having a substantially U-shaped body section 17, cap section 18 and 19 and an end section 20, which are secured to the body section in any desired manner. The cap section 18 is clamped to the inner surface of one leg of the body section and the cap section 19 is clamped to the inner surface of the other leg. The cap sections are axially aligned with each other and are spaced apart for accommodating the control lever 16 as will hereinafter fully appear. The end section 20 is clamped to the outer end surface of the leg of the body section to which the cap section 19 is clamped.

Clamped between the body section 17 and the cap 18 is a flexible diaphragm 21. At one side of this diaphragm there is a chamber 22 which is in constant open communication with a passage 23. At the opposite side of the diaphragm there is a chamber 24 which is open to the atmosphere through a central opening 25 provided in the cap 18.

Contained in chamber 22 and abutting one face of the diaphragm 21 is a diaphragm follower 26. Contained in chamber 24 and abutting the opposite face of the diaphragm 21 is a diaphragm follower 27. The followers 26 and 27 are secured together by means of a stem 28 which is carried by the follower 26 and which extends through the diaphragm and has screwthreaded engagement with the follower 27. The diaphragm follower 27 is provided with a stem 29 which extends through the central opening 25 in the cap 18 to the exterior of the casing for a purpose hereinafter described, there being sufficient clearance between the stem and the casing to ensure an always open communication between the chamber 24 and the atmosphere.

Axially aligned with the chamber 22 and disposed at the left thereof, as viewed in the drawings, is a bore 30 which is closed at its outer end by means of a plug 31 having screwthreaded engagement with the casing. This bore is connected to chamber 22 by way of a central passage 32 and is also in constant open communication with a passage 33. Contained in this bore is a valve 34 for controlling communication through the central passage 32. This valve is adapted to have seating engagement with a valve seat 35 which surrounds the passage 32 and is provided with a fluted stem 36 which extends through the central passage into the chamber 22, the end of which stem is spaced away from the follower 26 when the valve 34 is in seating engagement with its seat 35.

Also contained in the bore 30 and interposed between and operatively engaging the plug 31 and the valve 34 is a spring 37 which tends, at all times, to urge the valve into seating engagement with its seat 35.

Clamped between the body section 17 and the cap 19 is a flexible diaphragm 38. At one side of the diaphragm is a chamber 39 which is open to the atmosphere through a central opening 40 provided in the cap portion 19. At the opposite side of the diaphragm is a chamber 41 which is in constant open communication with a passage 42 which passage is connected to the passage 23 and pipe 12.

Contained in chamber 39 and abutting one face of the diaphragm 38 is a diaphragm follower 43. Contained in chamber 41 and abutting the opposite face of the diaphragm 38 is a diaphragm follower 44. The followers 43 and 44 are secured together by means of a stem 45 which is carried by the follower 44 and which extends through the diaphragm and has screwthreaded engagement with the follower 43. The diaphragm follower 43 is provided with a stem 46 which extends through the central opening 40 in the cap 19 to the exterior of the casing for a purpose hereinafter described, there being sufficient clearance between the stem and the casing to ensure always open communication between the chamber 39 and the atmosphere.

Axially aligned with the chamber 41 and disposed at the right hand side thereof, as viewed in the drawings, is a diaphragm 47, which is clamped between the U-shaped casing section 17 and the end section 20. Formed at one side of the diaphragm 47 is a chamber 48 which is in constant open communication with a passage 49 which is connected to passage 33 and pump discharge pipe 11. At the opposite side of the diaphragm is a chamber 50 which is open to the chamber 41 through a central opening 51.

Contained in chamber 50 is a follower 52 which is secured to the diaphragm 47 by means of a follower nut 53 which nut has screwthreaded connection with the follower. Clamped to the follower 52 by means of a follower stem 54 having screwthreaded connection with the follower is a valve 55 which is movable into and out of engagement with an annular seat rib 56 for controlling communication through the central opening 51, the seat rib being formed on the casing and encircling the opening. The stem 54 extends through opening 51 into chamber 41 where it is adapted to be engaged by the follower 44. There is however normally a slight clearance between the end of the stem and the follower 44 to insure the proper seating of the valve 55.

The chamber 48 is adapted to be connected to the chamber 50 by way of a passage 59 which is formed in the diaphragm follower nut 53 and the diaphragm follower 52 which is controlled by a valve 62 carried by a plunger 61 slidably mounted in a wall 60 of the end casing 20. This valve is adapted to engage with a valve seat 65 carried by the diaphragm follower nut 53 in axial alignment with the valve and encircling the passage 59 for closing the communication through the passage. The plunger, at its other end, is provided with a head 66 which is adapted to engage one side of the wall 60 to limit movement of the plunger toward the diaphragm nut. Interposed between and operatively engaging the head 66 and a cap 67 is a spring 68 which at all times tends to move the plunger to the position in which it is shown in Fig. 2 of the drawings.

The end section 20 of the casing is provided with a chamber 70 which is connected to passages 23 and 33. Contained in this chamber is a ball check valve 71 which prevents backflow of liquid from the chamber to the passage 33 and which is normally biased toward its seated or passage closing position by means of a spring 72, thus normally cutting off communication from the passage 33 to the chamber 70 and the passage 23.

The control arm or lever 16 extends between the ends of the follower stems 29 and 46 and at one end is pivotally mounted on a pin 73 mounted in lugs provided on the central portion of the U-shaped body section 17 of the casing. The other end of the arm or lever is operatively connected by means of a pin 74 to the right hand end of an operating plunger 75 of the solenoid portion 15. The lever or arm intermediate its ends is provided on one side with a boss 76 for engagement with the diaphragm follower stem 29 and is provided on the other side with a similar boss 80 for engagement with the diaphragm follower stem 46.

The solenoid portion 15 for effecting the operation of the lever 16 comprises in addition to the plunger 74, a release coil or winding 81, an application coil or winding 82 and a spring 83. The spring 83 is interposed between and operatively engages the lefthand end of the plunger 75 and a bracket 84 carried by the vehicle. This spring tends to at all times urge the plunger in a direction toward the right hand for a purpose presently described.

The plunger 75 is made of soft iron and is encircled by the windings or coils 81 and 82, the flow of current from the storage battery 10 through winding or coil 81 in one direction causing the plunger to move toward the left hand against the opposite action of the spring 83 as viewed in the drawings, and the flow of current from the storage battery through the coil or winding 82 in the opposite direction causing the plunger to move toward the right hand.

The electric circuit for controlling the release winding or coil 81 is a low wattage circuit of the normally closed type which is under the control of the operator's brake controlling switch device 3, the conductor's switch 5, a break-in two of the train, the trip switch device 4 and the safety control or deadman's switch device 6.

The electric circuit for controlling the application winding or coil 82 is of the normally open type which is controlled only by operation of the operator's brake controlling switch device 3.

The above mentioned circuits comprise a plurality of train line wires or conductors which extend throughout the length of the train, there being suitable couplings between the adjacent ends of the vehicle and the wires. These train wires or conductors, for the purpose of clarity, are designated as conductor's wire 85, release wire 86, return wire 87 and application wire 88.

It will be noted that one end of the release coil or winding 81 on each vehicle of the train is connected to the release wire 86, and that the other end of the coil or winding is connected to the return wire 87, the return wire being connected to the negative terminal of the storage battery 10 on the locomotive or leading vehicle of the train. One end of the coil or winding 82 on each vehicle of the train is connected to the application wire 88 and the other end of the coil or winding is connected to the return wire 87. The conductor's wire 85 and the release wire 86 are connected together at the rear end of the last vehicle of the train by means of a readily attachable connector 90.

The operator's manually controlled switch device 3 comprises a foot pedal 91 which is pivotally mounted on a rigidly fixed bracket 92. Carried by and suitably insulated from the pedal 91 is a contact plate 93 which is adapted to be moved into and out of engagement with a pair of contact members, such for example as, plungers 94 and 95. The contact member or plunger 94 is connected by means of a conductor 96 to one of the stationary contacts 97 of the safety control switch device 6. The other contact 97 of the safety control switch device is connected to the positive terminal of the storage battery 10 by way of a conductor 98, a resistance element 99 and a conductor 100. The contact member or plunger 95 is connected to the conductor's wire 85.

The switch device 3 further comprises a rheostat 101 which controls the supply current from the storage battery 10 to the application wire 88. The rheostat comprises a winding or coil 102 connected at one end to the application wire 88 and is provided intermediate its length with a plurality of stationary contacts 103, 104, 105 and 106 which are adapted to be engaged successively by a movable contact member 107 carried by and insulated from an arm 108 which forms a part of the foot pedal 91. The contact member 107 is connected to the conductor 100 leading from the positive terminal of the storage battery 10 by means of a branch conductor 109.

The safety control or deadman's switch device 6 comprises a depressible button having secured thereto and insulated therefrom a bridging contact 110, adapted when depressed against the opposing force of a spring 111 to bridge the stationary contacts 97 hereinbefore mentioned. In controlling the vehicle the operator maintains the button depressed.

The conductor's switch device 5, one of which is provided on each vehicle of the train, is interposed in the conductor's wire 85 and comprises a depressible button having secured thereto and insulated therefrom a bridging contact 112, adapted when urged upwardly by a spring 113 to bridge two stationary contacts 114 the switch normally being maintained in its bridging or circuit closing position.

The trip switch device 4 is also interposed in the conductor's wire 85 and may comprise a pivotally mounted contact arm 115 normally adapted to bridge two spring contacts 116. The contact arm 115 is adapted to engage a ramp 117 located along the track for rocking the contact arm for automatically opening the circuit between the two contacts 116.

*Operation*

With the parts of the apparatus in the release or running position, as shown in the drawings, the trip switch device 4 and the conductor's switch device 5, one of which is provided on each vehicle, will be maintained in their circuit closing position and the safety control or deadman's switch device 6 will be maintained in its circuit closing position by manual pressure applied by the operator. With these switch devices thus positioned the release coil or winding 81 of each controlling valve device will be energized through a circuit including the positive terminal of the storage battery 10, conductor 100, resistance element 99, conductor 98, the safety control or deadman's switch 6, conductor 96, plunger 94 of the manually controlled switch device 3, contact plate 93, plunger 95, conductor's wire 85, conductor's switch devices 5, rear coupling connector 90, the release wire 86, the winding or coil 81 on each vehicle, the return wire 87 and the grounded negative terminal of the storage battery 10. Upon energization of the coil or winding 81 of each brake controlling valve device 1 the operating plunger 75 and thereby the connected arm or lever 16 of the device are caused to be moved against the opposing action of the spring 83 to their release or normal position in which they are shown in the drawings.

Since the boss 76 on the lever 16 engages the diaphragm follower stem 29, movement of the lever to this position unseats the valve 34 against the opposing action of the spring 37 through the medium of the diaphragm follower 26, diaphragm 21 and diaphragm follower 27, the follower 27 engaging the end of the fluted stem 36 and moving the valve 34 away from its seat 35.

With the valve 34 unseated, communication is established between the bore 30 and the chamber 22 by way of the central passage 32 for a reason presently described.

Movement of the lever into this position causes the boss 89 to be moved out of engagement with the end of the diaphragm follower stem 46, thus the flexible diaphragm 38 and 47 are maintained in the position in which they are shown, thus maintaining the valve 55 in seating engagement with the annular seat rib 56.

It should here be mentioned that with the exception of the atmosphere diaphragm chambers 24 and 39 all of the other chambers, passages, pipes, pump and brake cylinder are initially filled with the operating oil for controlling the brakes.

When the vehicle is traveling over the road, the oil pump 2 on each vehicle is driven to displace oil in the systems. Since the hydraulic system is identical on each vehicle the following description of the operation will for simplicity be limited to one system. The oil pump as it continues to operate causes oil to circulate from the pump through pipe 11, passage 33, bore 30, past the open valve 34, chamber 22, passage 23 and pipe 12 to the pump. Since there is no restriction or opposition to this flow of liquid there will be no pressure built up in the circulating system so that there will be no flow of liquid from the passage 33 through pipe 13 to the brake cylinder or past the check valve 71, nor will there be any flow of liquid through passage 49 to the chambers 48 and 50 or through passage 42 to the chamber 41. From this it will be understood that since the oil circulates freely through the circuit just traced the brakes will remain in their normal position as shown.

When it is desired to effect a service application of the brakes, the foot pedal 91 is depressed a distance corresponding to the desired degree of application of the brakes, that is to say the greater the movement of the pedal the greater will be the degree of application obtained.

The foot pedal as it is depressed rocks in a counter-clockwise direction about its pivotal connection with the bracket 92 causing the contact plate 93 to move in a direction away from the plungers 94 and 95 and causing the contact 107 to move into engagement with the stationary contact 103. As the pedal and thereby the contact plate 93 is thus moved, the plungers 94 and 95 will move outwardly under the influence of springs 120 and 121, respectively.

At substantially the same time or immediately after the contact 107 engages the contact 103, stop collars on the plungers 94 and 95 engage the plunger casing and bring the plungers to a stop and as a result continued movement of the pedal will cause the contact plate 93 to move out of engagement with the plungers 94 and 95, and thus open the circuit through the conductor's wire 85 and thereby through the release wire 86 and coils 81.

When the contact 107 engages the contact 103 the normally open circuit through the application coil or winding 82 of the controlling valve device on each vehicle of the train is closed.

The circuit just closed through which current is supplied for energizing the winding or coil 82 of the controlling valve device 1 on each vehicle of the train comprises the conductor 100 which leads from the positive terminal of the storage battery 10, conductor 109, contact 107, contact 103, resistance coil 102, application wire 88, coil or winding 82 of each controlling valve device, return wire 87 and the grounded negative terminal of the storage battery 10. It will be understood that the amount of current supplied to the winding or coil 82 will be determined by the position of the pedal 91 for as the contact 107 is moved in a counter-clockwise direction progressively into engagement with the contacts 103 to 106 the resistance 102, which is included in the circuit for the coil or winding 82, is decreased, thus the amount of current flowing to the coil 82 is increased.

Energization of the winding or coil 82 of each controlling valve device 1 will cause the plunger 74 of the solenoid portion 15 and thereby the attached lever 16 to move to its extreme right hand position, such movement being assisted by the spring 83 at the beginning of its travel. Initial movement of the plunger 75 in this direction is not delayed even though the coil or winding 81 which is energized through a low wattage circuit should be maintained energized for a short interval of time after the coil 82 is energized, energization of the coil 82 will overcome the opposing force of the coil 81.

As the lever 16 is being moved toward this position, the spring 37 acts to seat the valve 34 on its seat 35, thus closing communication between the bore 30 and chamber 22 and thereby interrupting the circulation of liquid from the outlet to the inlet of the pump. After the valve is seated the diaphragm 21 and associated followers, due to the inherent resiliency of the diaphragm, move toward the right relative to the valve 34 until the follower 27 engages the cap portion 18 and brings the diaphragm assemblage to a stop. When this occurs the diaphragm follower 26 will be out of engagement with the fluted stem 36 of the valve. This insures the proper seating of the valve. When the diaphragm assemblage is brought to a stop the lever 16 will be in its midway position in which the lever engages the end of the follower stem 46.

As the lever 16 continues to move in a direction toward the right hand the diaphragm 38 is caused to flex in the same direction and thereby moves the diaphragm follower 44 into engagement with the end of the stem 54 and forces the valve 55 out of engagement with its seat rib 56. As this movement is continued the valve seat 65 is moved into engagement with the valve 62, thereby cutting off communication between chambers 48 and 50 by way of passage 59. After the valve seat 65 engages the valve 62, the continued movement of the follower nut 53 causes the plunger 61 to be moved against the opposing pressure of the spring 68, the spring acting to maintain the valve 62 in close contact with the valve seat 65.

With the communication between bore 30 and chamber 22 in each of the brake controlling valve devices cut off the circulation of oil from the pump discharge pipe 11 to the pump supply or inlet pipe 12 by way of passages 33 and 23 is stopped, as hereinbefore described. Under these conditions the oil discharged by the pump to the pump discharge pipe 11 and connected passage 49 will flow to the chamber 48 in the brake controlling valve device 1 and also to the brake cylinder 9 by way of connected passage 33 and passage and pipe 13. As the pressure of oil rises, the brake cylinder 9 on each vehicle of the train will operate to effect an application of the brakes. At the same time the pressure in chamber 48 of each controlling valve device is being built up and will continue to build up until the pressure of liquid in this chamber and consequently in the brake cylinder has been increased to a degree slightly exceeding the opposing force of the plunger 75 transmitted through the lever 16. When this occurs the pressure of the liquid in the chamber 48 and acting on one face of the diaphragm 47 and on the diaphragm nut 53 causes the diaphragm to move in a direction toward the left hand, the valve 62 being maintained in engagement with its seat 65 by spring 68 until the plunger 61 is brought to a stop by the engagement of the head 66 thereof with the wall 60.

If the vehicle is still in motion when the plunger 61 is brought to a stop the further increase in the pressure of liquid in chamber 48 causes the diaphragm 47 to act to move the valve seat 65 out of engagement with the valve 62. Liquid now flows from chamber 48 through passage 59 to chamber 50 and from thence past the unseated valve 55 to the pump inlet by way of chamber 41, passage 42 and pipe 12. The distance between the valve and its seat will be such that it will permit liquid to flow to chamber 50 and thereby to the pump inlet at a rate corresponding to the rate of flow of liquid from the pump to the chamber 48, so that the pressure in chamber 48 will be maintained at that called for by the setting of the brake switch device 3.

When the vehicle comes to a stop, the pump will of course cease to function, and since no further increase in pressure in the liquid in chamber 48 is possible the plunger 75 will, when the pressure in chamber 48 has reduced slightly, cause the diaphragm assemblage to operate to move the valve seat 65 into seating engagement with the valve 61, thus the brakes will be maintained applied.

From the foregoing description it will be understood that if it is desired to increase the brake cylinder pressure while the vehicle is in motion, the pedal 91 may be depressed further in its application zone thereby further rotating the arm 108 in a counterclockwise direction to decrease the amount of resistance in the circuit and thus increase the amount of current flowing to the application coil or winding 82. Upon such an increase in the current supply to the coil or winding 82 the plunger 75 is caused to exert increased force on the lever 16 and thereby on the diaphragm 47, thus it will require a higher pump discharge pressure and consequently a higher brake cylinder pressure to balance the opposing force of the lever 16.

The brakes may be fully released by permitting the foot pedal 91 to return to release position, as shown in the drawings, in which position the contact 109 is moved out of engagement with the contact 103 thus opening the circuit from the storage battery 10 to the application coil or winding 82 of each controlling valve device 1 throughout the train, thus deenergizing the application coil or winding on each vehicle. At the same time or slightly before this circuit is opened the contact plate 93 will be moved into engagement with the plungers 94 and 95 so that the release coil or winding 81 will be energized by way of the circuit hereinbefore traced.

Upon deenergization of coil or winding 82 and energization of coil or winding 81 the plunger 75 and attached lever 16 will be moved to the position in which they are shown in the drawings. The lever 16 as it thus moves forcing the valve 34 out of engagement with its seat 35 so that the pump discharge pipe and connected chamber 48 and brake cylinder 9 will be relieved of oil pressure in a manner hereinbefore described, thus permitting the brake cylinder 9 on each vehicle to effect a release of the brakes.

The release of the brakes may be graduated off instead of fully releasing same, by permitting a partial movement of the pedal 91 toward release position, so as to reduce the degree of energization of the application coil or winding 82. This results in a reduction in the force exerted by the plunger 75 and thereby determines the degree of reduction in brake cylinder pressure called for by the brake control switch device 3.

As hereinbefore mentioned the circuit through which current is supplied from the battery 10 for energizing the release coil or winding 81 of the controlling valve device is of the closed type. Therefore, when this circuit is rendered ineffective either by loss of current supply, operation of the safety control switch device 6, operation of a conductor's switch device 5, operation of the trip switch device 4, or in case of a break-in-two of the train, the release coil or winding is deenergized and full braking forces will be effective as will now be described.

When the circuit leading to the release coil or winding 81 fails or is opened in any of the above enumerated ways, the spring 83 will move the plunger 75 and attached lever 16 to a position in which the lever 16 will assume its central or midway position, that is, a position perpendicular to the caps 18 and 19 where it will not operate the follower stem 46. Movement of the lever 16 to this position permits the spring 37 to move the valve 34 into seating engagement with its seat 35. Since the lever 16 does not operate the plunger 46 the valve 55 remains seated as shown in Fig. 2 of the drawings.

With the valve 34 seated communication is cut off between bore 30 and chamber 22 so that circulation of oil from passage 33 to passage 23 is cut off and with the valve 55 seated circulation of oil from chamber 50 to chamber 41 is cut off. Therefore as the pump continues to operate the pressure in the pump discharge pipe 11 and connected passages 33 and 49 will increase and as a consequence the pressure in the brake cylinder 9 will be increased to effect an application of the brakes.

It will be noted that when an application of the brakes is effected in the manner just described the self-lapping portion of the brake controlling valve device is inoperative and the pressure in the pump discharge pipe and connected brake cylinder will be increased until such pressure is sufficient to overcome the setting of the check valve spring 72. When this occurs the ball check valve 71 will be unseated so that oil discharged by the pump at a pressure above the setting of the spring will be free to flow to the pump supply pipe 12, by way of chamber 70, passage 23, and passage 42, to limit the brake cylinder pressure to a predetermined degree.

When the circuit through the release coil or winding 81 is closed following an application of the brakes, of the type just described, the release coil or winding 81 is again energized. Upon energization of the coil or winding, the plunger 75 and attached lever 16 are caused to move to the position in which they are shown in the drawings, thereby unseating the valve 34 to effect a release of the brakes as hereinbefore described.

Having now described my invention, what I claim as new and desire to secure by Letters Patent, is:

1. An electrically controlled brake comprising a hydraulic system for effecting an application and a release of the brakes, said hydraulic system comprising a pump for normally circulating a hydraulic medium through the system, a brake cylinder device, and a brake controlling valve device operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes and electrical means under the control of an operator for effecting the operation of the brake controlling valve device, said electrical means comprising electroresponsive means operative when energized to effect operation of said brake controlling valve device to impede the flow of the hydraulic medium through the system and other electroresponsive means operative when energized to effect operation of said brake controlling valve device to permit the circulation of the hydraulic medium through the system.

2. An electrically controlled brake comprising a hydraulic system for effecting an application and a release of the brakes, said hydraulic system comprising a pump for normally circulating a hydraulic medium through the system, a brake cylinder device, and a brake controlling valve device operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes, a control lever pivotally mounted on said brake controlling valve device for controlling the operation of said brake controlling valve device; and electrical means under the control of an operator for effecting the operation of said control lever, said electrical means comprising electroresponsive means operative when energized to effect movement of said lever in one direction to cause said brake controlling valve device to permit the free circulation of the hydraulic medium through the system and other electroresponsive means operative when energized to effect movement of said lever in a different direction to cause said brake controlling valve device to impede the flow of the hydraulic medium through the system.

3. An electrically controlled brake comprising a hydraulic system for effecting an application and a release of the brakes, said hydraulic system comprising a pump for normally circulating a hydraulic medium through the system, a brake cylinder device, and a brake controlling valve device operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes; electrical means for effecting the operation of said brake controlling valve device; said electrical means comprising electroresponsive means operative when energized to effect the operation of said brake controlling valve device to impede the flow of the hydraulic medium through the system and other electroresponsive means operative when energized to effect operation of said brake controlling valve device to permit the circulation of the hydraulic medium through the system, and switch means under the control of an operator for effecting the operation of said electrical means.

4. An electrically controlled brake comprising a hydraulic system for effecting an application and a release of the brakes; said hydraulic system comprising a pump for normally circulating a hydraulic medium through the system, a brake cylinder device, valve means operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes, pressure sensitive means operative for limiting the pressure of the hydraulic medium in the brake cylinder, and apparatus operative to control the operation of said valve means, said apparatus comprising electroresponsive means operative when energized to effect the operation of said valve means to permit the flow of the hydraulic medium through the system and other electroresponsive means operative when energized to effect the operation of said valve means to impede the flow of the hydraulic medium through the system and for at the same time exerting a pressure on said pressure sensitive means when an application of the brakes is being effected, and said pressure sensitive means being subject to the opposing pressure of said other electroresponsive means and the brake applying hydraulic medium and being operative when the pressure of the hydraulic medium exceeds the opposing pressure of the other electroresponsive means for limiting the pressure of the hydraulic medium in the brake cylinder.

5. An electrically controlled brake comprising a hydraulic system for effecting an application and a release of the brakes, said hydraulic system comprising a pump for normally circulating a hydraulic medium through the system, a brake cylinder device, and valve means operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes; electrical means for controlling the operation of said valve means; said electrical means comprising electroresponsive means operative when energized to effect the operation of said valve means to permit circulation of said hydraulic medium through the system and other electroresponsive means operative when energized to effect the operation of said valve means to impede the flow of the hydraulic medium through the system, means responsive to opposing forces produced by the other electroresponsive means and the hydraulic medium in the brake cylinder for limiting the pressure in the brake cylinder; and means for varying the amount of current supplied to said other electroresponsive means and thereby the force of the other electroresponsive means, said electrical means being under control of an operator.

6. An electrically controlled brake comprising a hydraulic system for effecting an application and a release of the brakes, said hydraulic system comprising a pump for normally circulating a hydraulic medium through the system, a brake cylinder device, and valve means operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes; electrical means for controlling the operation of said valve means; said electrical means comprising electroresponsive means operative when energized to effect the operation of said valve means to permit circulation of said hydraulic medium through the system and other electroresponsive means operative when energized to effect the operation of said valve means to impede the flow of the hydraulic medium through the system, a valve, means responsive to opposing forces produced by the other electroresponsive means and the hydraulic medium in the brake cylinder for limiting the pressure in the brake cylinder, said means being operative when the force produced by the hydraulic medium in the brake cylinder exceeds that of the other electroresponsive means to unseat said valve to provide for the discharge of the hydraulic medium under pressure for limiting the pressure of the hydraulic medium in the brake cylinder; and means under control of an operator for varying the amount of current supplied to said other electroresponsive means and thereby the force of the other electroresponsive means.

7. A brake apparatus comprising a hydraulic system for effecting an application and a release of the brakes, said hydraulic system comprising a pump for displacing the liquid in the system, a brake cylinder, valve means having a release position for establishing a passage through which the hydraulic medium freely flows from the discharge end of the pump back to the inlet end of the pump, and having an application position for closing off the flow of the hydraulic medium through said passage to the inlet end of the pump to provide for the displacement of the hydraulic medium from the pump to said brake cylinder, electroresponsive means operative when energized to retain said valve means in its release position other electroresponsive means operative when energized to effect the operation of said valve means to its application position, and control means for energizing said other electroresponsive means and for at the same time deenergizing said electroresponsive means.

8. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, a control lever for normally maintaining said valve means in its release position and operative for effecting the operation of the valve to its application position, and electrical means under the control of an operator for controlling said control lever, said electrical means comprising electroresponsive means operative when energized to effect operation of said lever for normally maintaining said valve means in the release position and another electroresponsive means operative when energized to effect operation of said lever for effecting the operation of said valve means to its application position.

9. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, and means for controlling said valve means, said means comprising electromagnetic means for maintaining said valve in its release position and spring means for effecting the operation of said valve means to an application position upon the failure of said electro-magnetic means to maintain said valve in its release position.

10. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, means normally maintaining said valve means in its release position and operative for effecting the operation of the valve means to an application position, a communication through which the hydraulic medium may flow from the discharge end of the pump back to the inlet end of the pump for by-passing said valve means in said main passage and other valve means for normally closing said communication and operative to open said communication upon a certain increase in the hydraulic pressure in the brake cylinder for limiting the hydraulic pressure in said brake cylinder to a predetermined degree.

11. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, means normally maintaining said valve means in its release position and operative for effecting the operation of the valve means to an application position, a communication through which the hydraulic medium may flow from the discharge end of the pump back to the inlet end of the pump for by-passing said valve means in said main passage, and a spring biased check valve device disposed in said communication for normally cutting off the flow of the hydraulic medium through said communication and operative upon a certain increase in the pressure of the hydraulic medium in said brake cylinder for effecting operation of said check valve device to open said communication for limiting the pressure in the brake cylinder.

12. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, pressure limiting means for limiting the pressure of the hydraulic medium displaced by the brake cylinder, and means normally maintaining said valve means in its release position and operative for effecting the operation of the valve means to its application position and for conditioning said pressure limiting means for operation to limit the pressure of the hydraulic medium in the brake cylinder.

13. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, pressure limiting means for limiting the pressure of the hydraulic medium displaced by the brake cylinder, and means normally maintaining said valve means in its release position and operative for effecting the operation of the valve means to its application position and for conditioning said pressure limiting means for operation to limit the pressure of the hydraulic medium in the brake cylinder, said last mentioned means comprising electro-magnetic means under control of an operator.

14. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, pressure limiting means for limiting the pressure of the hydraulic medium displaced by the brake cylinder, and means normally maintaining said valve means in its release position and operative for effecting the operation of the valve means to its application position and for conditioning said pressure limiting means for operation to limit the pressure of the hydraulic medium in the brake cylinder, said last mentioned means comprising electro-magnetic means for exerting pressure on said limiting means when energized, and electric resistance means variable under the control of an operator for effecting variations in the pressure exerted by said electro-magnetic means.

15. An electrically controlled brake comprising a hydraulic system for effecting an application and a release of the brakes, said hydraulic system comprising a pump for normally circulating a hydraulic medium through the system, a brake cylinder device, and a brake controlling valve device operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes; spring means for effecting the operation of the controlling valve device to impede the flow of the hydraulic medium through the system, and electro-responsive holding means operative when energized to retain said controlling valve device, against the opposing pressure of said spring means, in the position to permit circulation of the hydraulic medium, a main holding circuit for normally energizing said holding means, and a switch interposed in said circuit operative upon the incapacitation of an operator to open said holding circuit for deenergizing said holding means.

16. An electrically controlled brake comprising a hydraulic system for effecting an application and a release of the brakes, said hydraulic system comprising a pump for normally circulating a hydraulic medium through the system, a brake cylinder device, and valve means operative at one time to impede the flow of the hydraulic medium through the system to effect the operation of the brake cylinder device to apply the brakes and operative at another time to permit the circulation of the hydraulic medium through the system to effect the operation of the brake cylinder device to release the brakes; spring means for effecting operation of the valve means to impede the flow of the hydraulic medium through the system; electro-responsive holding means operative when energized to retain said valve means in its position to permit circulation of the hydraulic medium; a holding circuit for normally energizing said holding means; a plurality of normally closed switches interposed in said holding circuit any one of which when open interrupts said holding circuit to cause deenergization of said holding means.

17. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, means for controlling said valve means, said means comprising electroresponsive means operative when energized to retain said valve means in its release position, other electro-responsive means operative when energized to permit movement of said valve means to its application position, a release circuit for normally energizing said electro-responsive means, an application circuit through which current may be supplied to energize said other electro-responsive means, and control means for energizing said application circuit and for deenergizing said release circuit.

18. A brake apparatus comprising a hydraulic system for effecting an application and a release of the brakes, said hydraulic system comprising a pump for displacing the liquid in the system, a brake cylinder, valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, means for controlling said valve means, said means comprising electro-responsive means operative when energized to retain said valve means in its release position, other electro-responsive means operative when energized to permit movement of said valve means to its application position, a release circuit for normally energizing said electro-responsive means, an application circuit through which current may be supplied to energize said other electro-responsive means, and control means for energizing said application circuit and for deenergizing said release circuit, and means responsive to the pressure of the hydraulic medium established in the brake cylinder during braking for limiting the brake cylinder pressure to a predetermined degree.

19. A brake apparatus comprising a hydraulic system for effecting an application and a release of the brakes, said hydraulic system comprising a pump for displacing the liquid in the system, a brake cylinder valve means having a release position for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, electro-responsive means operative when energized to maintain said valve means in its release position, a normally closed circuit for energizing said electro-responsive means, a control switch interposed in said circuit and operative in an application position to open said circuit to deenergize said electro-responsive means, means operative in accordance with a track indicator for opening said circuit, means manually controlled independently of said control switch for opening said circuit, and means automatically operative in response to opening of said circuit for effecting movement of said valve means to application position.

20. A brake apparatus comprising a hydraulic system for effecting an application and a release of the brakes, said hydraulic system comprising a pump for displacing the liquid in the system, a brake cylinder, valve means having a release portion for establishing a main passage through which the hydraulic medium freely flows from the discharge end of the pump back to the inlet end of the pump, a branch passage in open communication with said main passage at a point intermediate the discharge end of the pump and said valve means and leading to said brake cylinder device, said valve means having an application position for closing off the flow of the hydraulic medium through the said main passage to the inlet end of the pump to provide for the displacement of the hydraulic medium from the pump to said brake cylinder by way of a portion of said main passage and said branch passage, electro-responsive means operative when energized to maintain said valve means in release position, a normally closed circuit for energizing said electro-responsive means, a foot pedal, controlled switch interposed in said circuit and having a release position for closing said circuit and an application position for opening said circuit, a trip switch device interposed in said circuit and automatically controlled from the track for opening said circuit, a conductor's switch device interposed in said circuit manually controlled from the vehicle for opening said circuit, and means automatically operative upon the opening of said circuit by either one of said switches for effecting movement of said valve means to its application position.

21. In a fluid pressure brake apparatus, in combination, a brake controlling valve device operative to one position for effecting an application of the brakes and operative to another position to effect the release of the brakes, electric means functioning upon its energization to maintain said brake controlling valve device in its brake releasing position, electric means functioning upon its energization and the denergization of the first mentioned electric means to actuate the brake controlling valve device to a brake application position to effect an increase in the degree of brake application, and means operative when both of said electric means are deenergized for actuating said brake controlling valve device to a second brake application position to effect an increase in the degree of brake application.

22. In a fluid pressure brake apparatus, in combination, a brake controlling valve device operative to one position for effecting an application of the brakes and operative to another position to effect the release of the brakes, electric means functioning upon its energization to maintain said brake controlling valve device in its brake releasing position, electric means functioning upon its energization and the deenergization of the first mentioned electric means to actuate the brake controlling valve device to a brake application position, means operative when both of said electric means are deenergized for actuating said brake controlling valve device to a second brake application position, control means having a normal position for effecting energization of said first mentioned electric means and deenergization of said second mentioned electric means and operative to a brake application position for effecting deenergization of said first mentioned electric means and energization of said second mentioned electric means, and means operative independently of said control means when said control means is in its said normal position for effecting deenergization of said first mentioned electric means.

23. In a fluid pressure brake apparatus, in combination, a brake controlling valve device operative to one position for effecting an application of the brakes and operative to another position to effect the release of the brakes, electric means comprising a first electroresponsive means and a second electroresponsive means, said electric means functioning upon energization of said first electroresponsive means and deenergization of said second electroresponsive means to maintain said brake controlling valve device in its brake releasing position and operative upon deenergization of said first and energization of said second electroresponsive means to actuate said brake controlling valve device to a brake application position, control means operative in an application position to effect energization of said second and deenergization of said first electroresponsive means, switch means controlled independently of said control means to effect deenergization of said first electroresponsive means, and means operative when both said first and said second electroresponsive means are deenergized for actuating said brake controlling valve device to a second brake application position.

24. A brake apparatus comprising a hydraulic system for effecting an application and a release of the brakes, said hydraulic system comprising a pump for displacing the liquid in the system, a brake cylinder, valve means having a release position for establishing a passage through which the hydraulic medium freely flows from the discharge end of the pump back to the inlet end of the pump and having an application position for closing off the flow of the hydraulic medium through said passage to the inlet end of the pump to provide for the displacement of the hydraulic medium from the pump to said brake cylinder, electroresponsive means operative when energized to retain said valve means in its release position, other electroresponsive means operative when energized to permit movement of said valve means to its application position, control means for effecting energization of said other electroresponsive means and for effecting deenergization of said electroresponsive means, and means responsive to the pressure of the hydraulic medium established in the brake cylinder during braking for limiting the brake cylinder pressure to a predetermined degree.

EVERETT P. SEXTON.

CERTIFICATE OF CORRECTION.

Patent No. 2,344,902. March 21, 1944.

EVERETT P. SEXTON.

It is hereby certified that error appears in the printed specification of the above numbered patent requiring correction as follows: Page 9, second column, line 41-42, claim 20, for the word "portion" read --position--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.